United States Patent
Fredenburg et al.

(10) Patent No.: US 10,614,182 B2
(45) Date of Patent: Apr. 7, 2020

(54) TIMING ANALYSIS FOR ELECTRONIC DESIGN AUTOMATION OF PARALLEL MULTI-STATE DRIVER CIRCUITS

(71) Applicant: Movellus Circuits Incorporated, Ann Arbor, MI (US)

(72) Inventors: Jeffrey Fredenburg, Ann Arbor, MI (US); Muhammad Faisal, Ann Arbor, MI (US); David M. Moore, Ann Arbor, MI (US); Ramin Shirani, Morgan Hill, CA (US)

(73) Assignee: Movellus Circuits, Inc., Ann Arbor, MI (US)

( * ) Notice: Subject to any disclaimer, the term of this patent is extended or adjusted under 35 U.S.C. 154(b) by 454 days.

(21) Appl. No.: 15/297,979

(22) Filed: Oct. 19, 2016

(65) Prior Publication Data

US 2018/0107774 A1 Apr. 19, 2018

(51) Int. Cl.
*G06F 17/50* (2006.01)

(52) U.S. Cl.
CPC ........ *G06F 17/5031* (2013.01); *G06F 17/505* (2013.01); *G06F 17/5036* (2013.01)

(58) Field of Classification Search
USPC ........................................................ 716/113
See application file for complete search history.

(56) References Cited

U.S. PATENT DOCUMENTS

| | | | |
|---|---|---|---|
| 5,999,060 A | 12/1999 | Zuta | |
| 6,218,876 B1 | 4/2001 | Sung | |
| 6,275,553 B1 | 8/2001 | Esaki | |
| 6,424,192 B1 | 7/2002 | Lee | |
| 6,496,965 B1 * | 12/2002 | van Ginneken | G06F 17/505 716/113 |
| 6,744,324 B1 | 6/2004 | Adams | |
| 6,826,247 B1 | 11/2004 | Elliott | |
| 7,216,249 B2 | 5/2007 | Fujiwara | |
| 8,117,576 B2 | 2/2012 | Mossawir | |
| 8,321,489 B2 | 11/2012 | Staszewski | |
| 8,427,205 B1 | 4/2013 | Nagaraj | |
| 8,791,734 B1 | 7/2014 | Hara | |
| 2004/0212399 A1 * | 10/2004 | Mulligan | G06F 1/3203 326/90 |
| 2005/0189972 A1 | 9/2005 | Foo | |
| 2013/0120036 A1 | 5/2013 | Zhu | |
| 2013/0300477 A1 | 11/2013 | Ueda | |
| 2016/0036454 A1 | 2/2016 | Moehlmann | |
| 2016/0204787 A1 | 7/2016 | Lotfy | |
| 2017/0193136 A1 | 7/2017 | Prasad | |

* cited by examiner

*Primary Examiner* — Eric D Lee
(74) *Attorney, Agent, or Firm* — Lance Kreisman; Peninsula Patent Group

(57) ABSTRACT

A computer-implemented method for manufacturing an integrated circuit chip includes generating a timing model for a first circuit description of an analog parallel multi-state driver circuit. The first circuit description of the analog parallel multi-state driver circuit having programmable driver states. The timing model is dependent on the driver states. The first circuit description of the analog parallel multi-state driver circuit and the generated timing model are provided for insertion into a second circuit description representing a digital system.

20 Claims, 19 Drawing Sheets

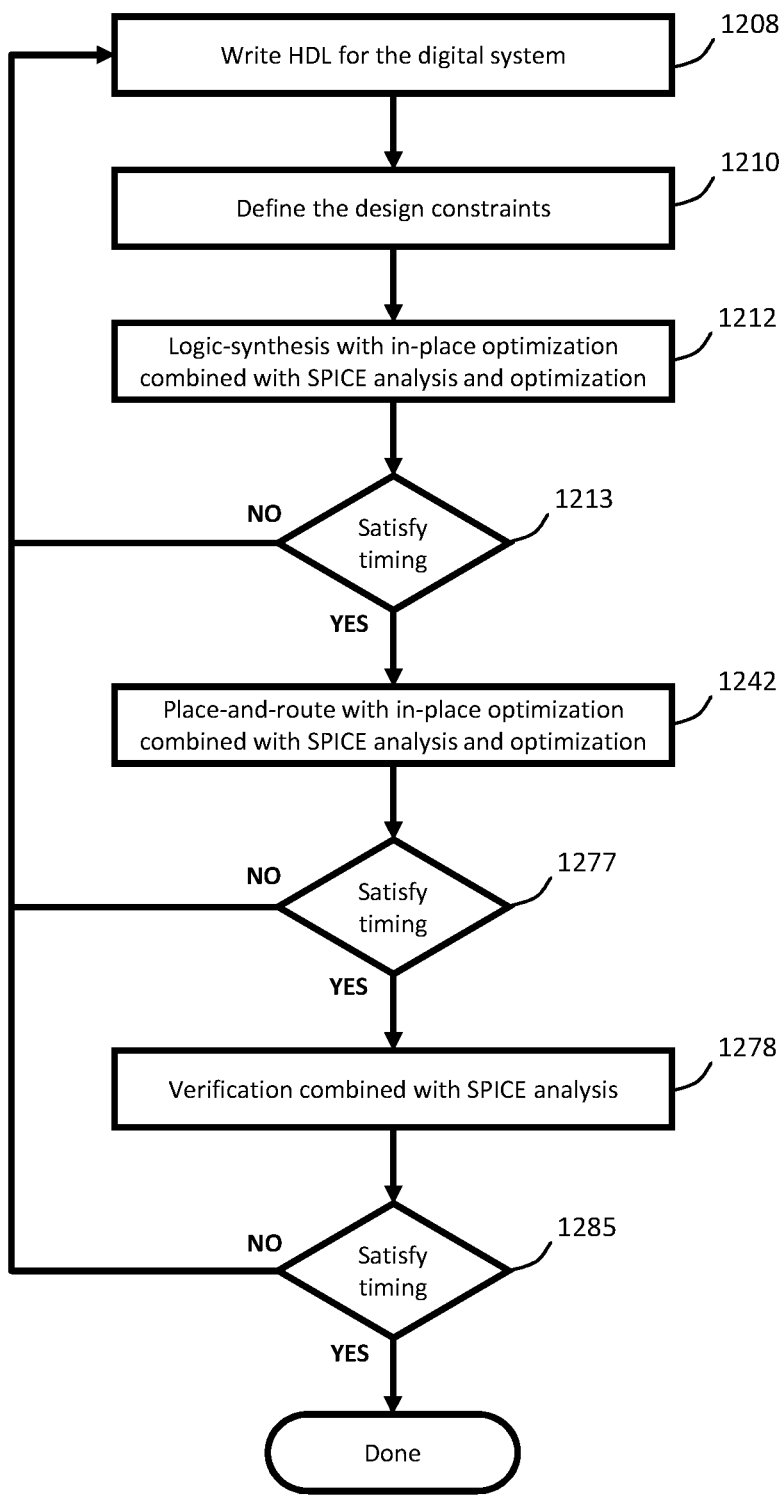

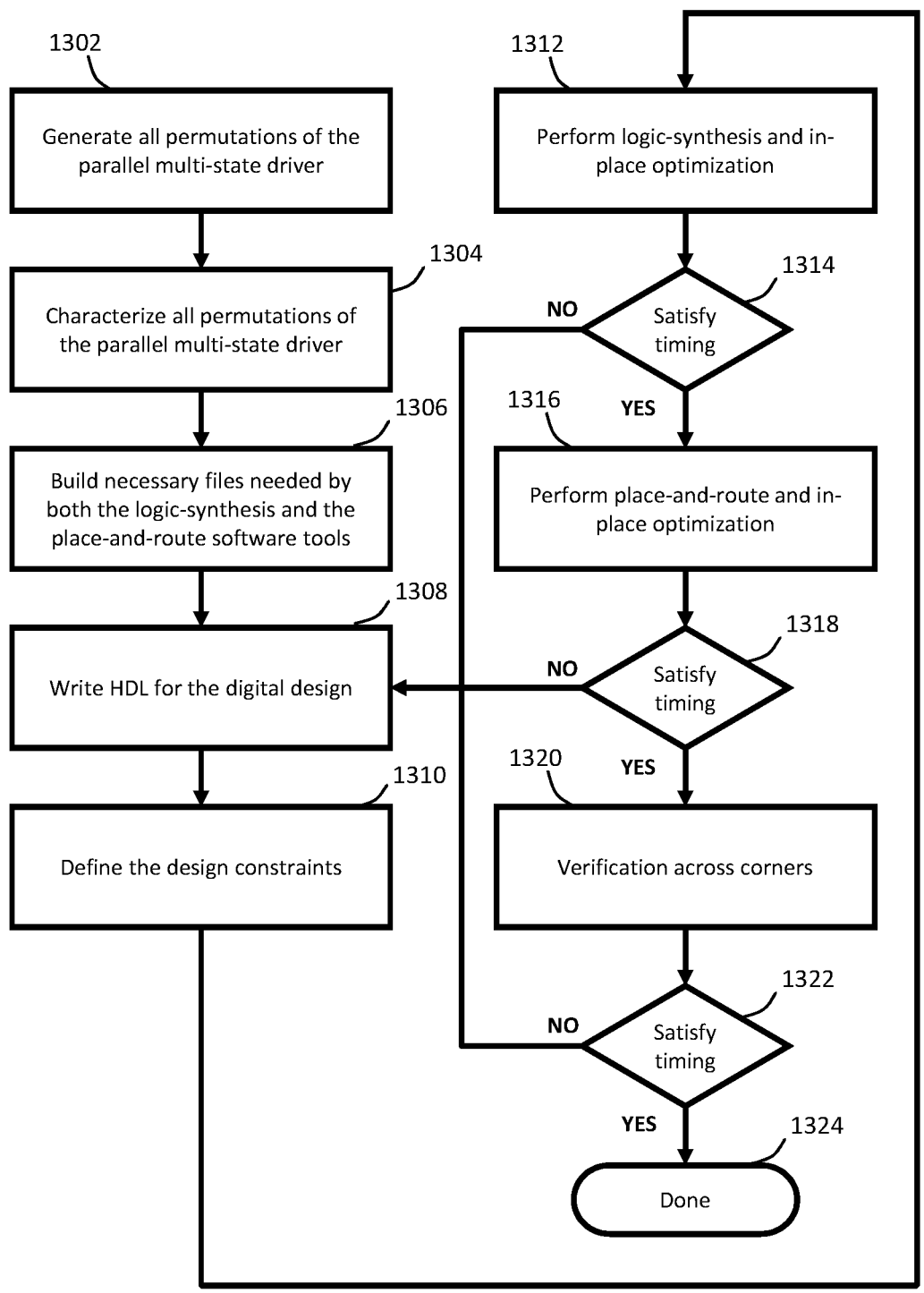

TIMING ANALYSIS FOR ELECTRONIC DESIGN AUTOMATION OF PARALLEL MULTI-STATE DRIVER CIRCUITS

TECHNICAL FIELD

The disclosure herein relates to electronic design automation (EDA) tools. More particularly, the disclosed embodiments relate to methods, systems, and user interfaces for performing timing analysis in a digital design flow for analog circuit blocks.

BACKGROUND

Electronic design automation (EDA) tools are often used to generate a detailed design of a semiconductor circuit. Computer-implemented tools such as computer-aided design (CAD) tools are often used to carry out the design flow. Many of the operations may be implemented as software running on computer servers and/or workstations.

A typical digital design flow may involve generating a system specification that provides design parameters for the semiconductor circuit to one or more of the EDA tools. A circuit implementing the system specification may then be generated manually or automatically (such as by using ready-made IP functions). The circuit may be entered by a hardware description language (such as Verilog, VHDL, or any other hardware description language (HDL)), or by other means. In a logic synthesis operation, an abstract form of desired circuit behavior (typically a register transfer level (RTL) description or behavioral description) is turned into a design implementation in terms of logic gates. In a verification operation, the netlist output by the logic synthesis operation is verified for functionality against the circuit design specification. A physical implementation of the netlist may then be performed, including an analysis to verify functionality, timing and performance across predetermined or user-specified ranges of process, voltage, and temperature parameters.

As integrated circuits become more and more complex, the timing behavior exhibited by certain circuit blocks becomes ever more critical to understand and evaluate. Generally, timing analysis involves measuring the propagation delay of signals through every timing path through a given system. During logic synthesis and place-and-route, timing analysis guides the optimization procedures. Analog circuits generally can't be optimized in the same way that logical circuits are optimized.

Conventionally, designers utilizing a digital design flow employ static timing analysis for digital circuit blocks. The static analysis includes a limited evaluation of propagation delays independent of the circuit block inputs and system data. While this method may operate well for digital circuit blocks, attempting to apply such a static timing analysis method to analog circuit blocks may be problematic, especially for analog parallel multi-state drivers that may exhibit intentionally different timing behavior depending on how the input signals are programmed.

Accordingly, what is needed are methods, systems and associated apparatus that allow for improved static timing analyses in digital design flows for analog circuit blocks such as parallel multi-state drivers.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 12A illustrates a flowchart of steps for a further embodiment of a method for manufacturing an integrated circuit.

FIG. 13 illustrates a flowchart of steps for an additional embodiment of a method for manufacturing an integrated circuit.

DETAILED DESCRIPTION

Embodiments of a computer-implemented method for manufacturing an integrated circuit chip are disclosed. In one embodiment, a computer-implemented method for manufacturing an integrated circuit chip includes generating a timing model for a first circuit description of an analog parallel multi-state driver circuit. The first circuit description of the analog parallel multi-state driver circuit having programmable driver states. The timing model is dependent on the driver states. The first circuit description of the analog parallel multi-state driver circuit and the generated timing model are provided for insertion into a second circuit description representing a digital system. By employing a timing model dependent on the parallel driver states, static timing analysis for an analog parallel driver can be accurately carried out in a digital design flow without the need to utilize separate analog-based timing analysis methods.

In another embodiment, a non-transitory computer-readable storage medium is disclosed. The medium stores instructions that when executed by a computer system will cause the computer system to, in response to a command from a client to commence operations for a digital design flow for a digital system, load a timing model for a first circuit description of an analog parallel multi-state driver circuit. The first circuit description of the analog parallel multi-state driver circuit having programmable driver states. The timing model is dependent on the driver states. The instructions also cause the computer to insert the first circuit description of the analog parallel multi-state driver circuit and the timing model into a second circuit description representing the digital system.

In a further embodiment, a computer-implemented method for manufacturing an integrated circuit chip includes retrieving a timing model for a first circuit description of an analog parallel multi-state driver circuit. The first circuit description of the analog parallel multi-state driver circuit has programmable driver states. The timing model being dependent on the driver states. The method includes inserting the first circuit description of the analog parallel multi-state driver circuit and the generated timing model into a second circuit description representing a digital system; logically-synthesizing the second circuit description; and performing a first static timing analysis on the second circuit description following the logically-synthesizing. The static timing analysis measures propagation delay associated with the first circuit description of the analog parallel multi-state driver circuit based on the timing model.

Figure 1:
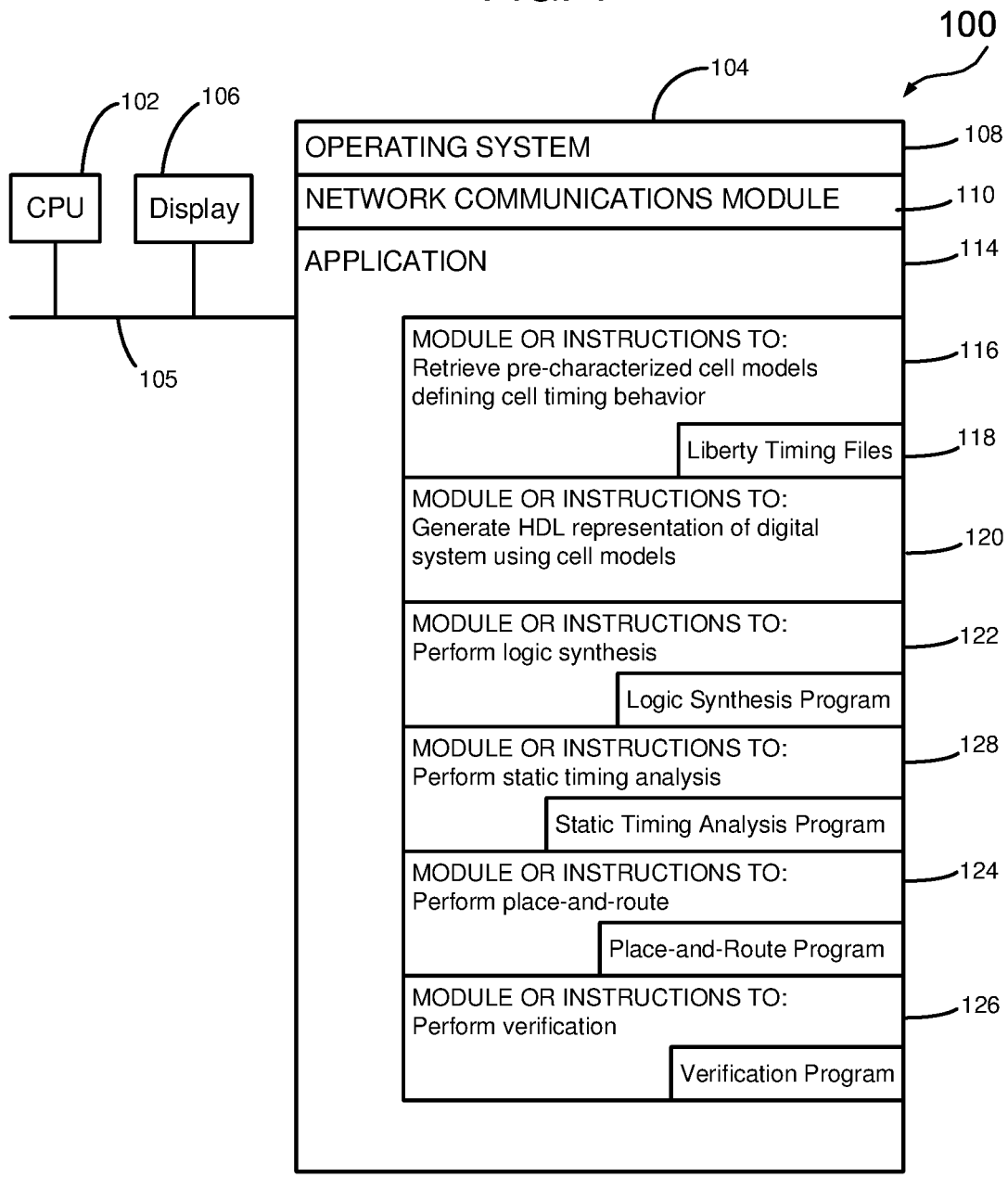
FIG. 1 illustrates one embodiment of an electronic design automation (EDA) system.

FIG. 1 illustrates one embodiment of an electronic design automation system (e.g., a server, a workstation, or other computer system), generally designated 100, that may be used to generate the detailed design of a digital system embodied as a semiconductor circuit. The system 100 may include one or more processors 102 for executing modules, programs and/or instructions stored in a memory 104. The system 100 may also include a display 106 that may be local or remote from the system. One or more communication busses 105 couples the processors to the memory. For some embodiments, the memory 104 may include high-speed main memory in the form of DRAM and may also include bulk memory in the form of one or more magnetic or optical disk-storage devices or solid state storage devices, or network access to cloud storage located remotely from the processors.

With continued reference to FIG. 1, the memory 104, or alternatively memory device(s) within the memory 104, comprises a computer-readable storage medium. In some embodiments, the memory 104 stores a variety of programs, modules and data structures, or a subset or superset thereof. An operating system 108 includes procedures for handling various basic system services and for performing hardware-dependent tasks. A network communications module (or instructions) 110 may be used for connecting the system 100 to other computers via a communication interface (not shown) and one or more communications networks, such as the Internet, other wide area networks, metropolitan area networks, and local area networks. An application or program 114 controls the operation and function of the system.

For some embodiments, and further referring to FIG. 1, the application or program 114 may include one or more programs, modules, or a subset or superset thereof. For example, a characterization module may be included that retrieves characterized cell models defining cell timing behavior for analog parallel multi-state driver circuits, at 116. In specific embodiments, the cell models include a parametric set of netlists and Liberty timing files (*.LIB), at 118, that capture the desired timing behavior for different combinations of programmed driver states, as more fully described below. The applications may also include a hardware description language (HDL) module, at 120, to generate HDL representations of the digital system utilizing the cell models. Respective logic synthesis, place-and-route, and verification modules 122, 124 and 126, are also provided to carry out logic synthesis, place-and-route, and verification operations. To provide for highly accurate timing analysis for the analog parallel multi-state driver circuit representations, a static timing analysis module 128 is provided. The static timing analysis module provides for coordinated operations concurrent with the various modules described above to provide for circuit design optimization at various stages of the digital design flow.

Figure 2A:
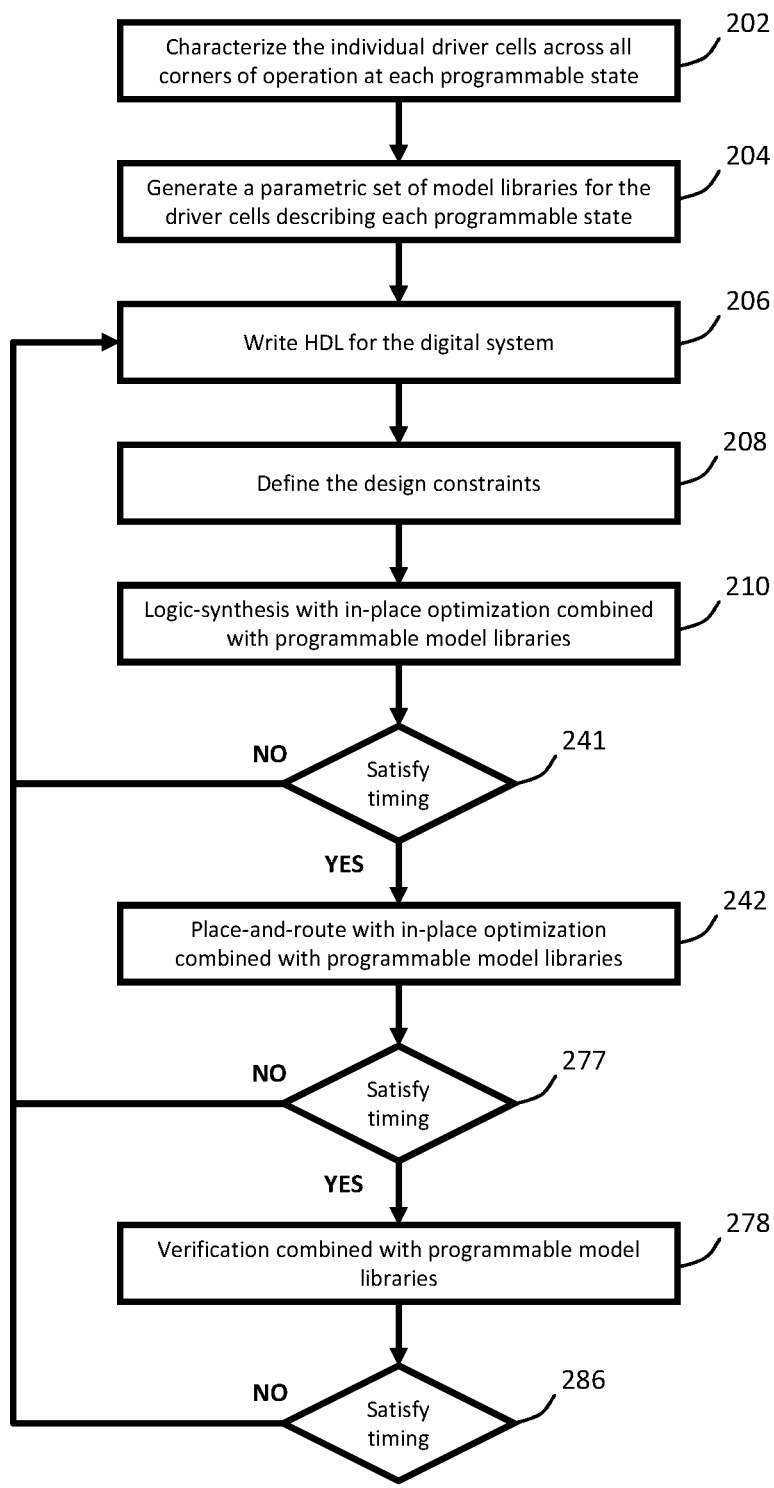
FIG. 2A illustrates a flowchart of steps for one embodiment of a method for manufacturing an integrated circuit utilizing the system of FIG. 1.

FIG. 2A illustrates a flow chart of steps for one embodiment of a method for carrying out static timing analysis on circuit representations utilizing the system of FIG. 1. The method begins by characterizing each individual driver cell that will form the analog parallel multi-state driver circuits across all corners of operation at each programmable state, at 202. Examples of circuits to serve as the foundation for netlist descriptions for certain forms of analog parallel multi-state driver circuits and the individual driver cells are shown in FIGS. 4A-11A.

Further referring to FIG. 2A, following characterization of the driver cells, a parametric set of netlists and library files that capture the desired timing behavior for different combinations of programed states is then generated, at 204. In one specific embodiment, the library files are Liberty timing files (*.LIB). Generally, netlist instances and library cells can share the same physical layout when the netlist instances and library cells represent different modes of operation for the same cell. The different modes of operation may correspond to, for example, a given driver cell within the analog parallel multi-state driver being enabled or disabled. When an individual driver cell is enabled, it will sink or source current into the load impedance seen through the drive pin. The drive pin will act as an output in the relevant netlist or library within the set of parametric libraries and netlists. When an individual cell is disabled, it will contribute to the load impedance of the net, but will not drive the external load. The drive pin will act as an input and present an input load impedance in the relevant netlist or library within the set of parametric libraries and netlists. Delays in timing libraries can be scaled to account for relative sizing between parallel drivers. This is not needed for thermometer configurations, and may result in binary scaling for DACs, ADCs, and such. Examples include but are not limited to delay lines, oscillators, ADCs, and DACs. Once the netlists and library files are generated, they may be stored on computer-readable media and/or transmitted electronically for utilization in a digital design flow.

With continued reference to FIG. 2A, with the netlists and library files for the analog circuit drivers available, an HDL description of the parallel multi-state driver may be inserted into the digital system by connecting the desired parallel driver elements, at 206. The system constraints used by the digital timing analysis may then be defined, at 208. The constraints may include, for example, input delays, output delays, clock frequency, and path delays for the analog parallel multi-state driver. Generally, the delay through the parallel driver should fall within some minimum and maximum range with a given resolution. Based on the clock frequency, the process can estimate how much delay is allowed for paths leading to and leading from the parallel driver. Specifically, the system constraints may constrain the path delay to the input of the parallel driver, and constrain the path delay from the output of the parallel driver. If the parallel driver 1 satisfies the required minimum and maximum delays, and the digital system is constrained to allow for the delays, then the system will satisfy the timing requirements. The constraints may also come into play during synthesis and place-and-route operations, described below, such that the minimum delay through the parallel driver will be constrained when the parallel driver is programmed to produce the shortest delay, and the maximum delay through the parallel driver will be constrained when the parallel driver is programmed to produce the longest delay. For one embodiment, the programming involves assigning a specific library file that sets the timing data of the individual cells to the appropriate case where the parallel driver will produce the shortest and/or longest delays.

Figure 2B:
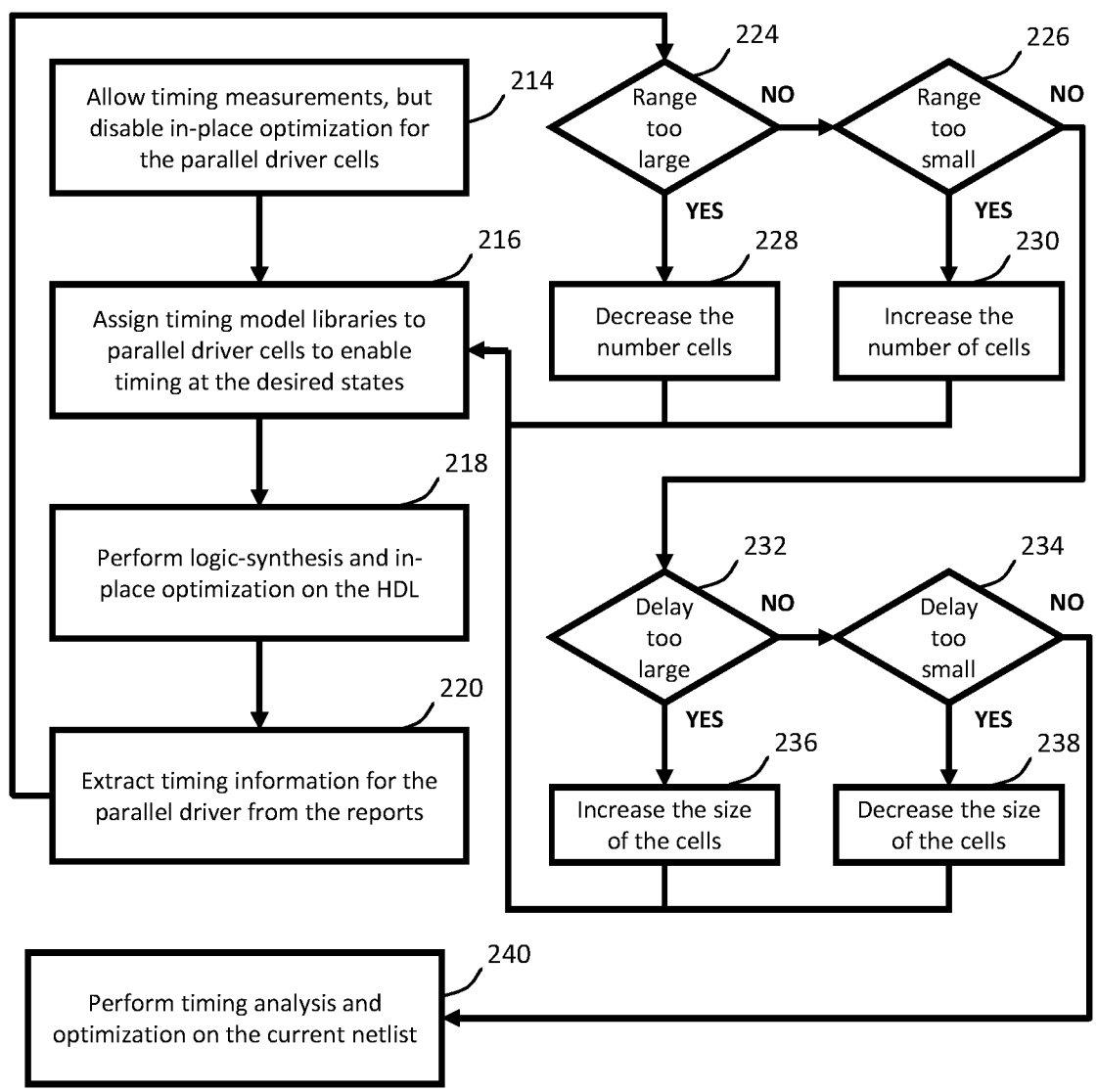
FIG. 2B illustrates steps corresponding to the logic synthesis step of FIG. 2A.

With the design constraints defined, at 208, the design flow moves to logic synthesis, controlled by the logic synthesis module, at 210. FIG. 2B illustrates a flowchart of steps setting forth one embodiment of a logic synthesis flow with in-place optimization combined with the programmable model libraries generated earlier (step 204). During logic synthesis, certain aspects of the parallel driver are disabled, at 214, such as in-place optimization on the parallel driver or the individual driver cells. In other words, the logic synthesis module is configured to not change the connections for the parallel driver, nor the size of the constituent driver cells. The appropriate timing model library is then assigned to the parallel driver and the individual driver cells, at 216, to enable timing at the desired operational state. As an example, for a tristate inverter representation, enabled driver cells are assigned a "drive" model, while disabled cells are assigned a "load" model. The model may be modified based on a desired relative scaling, such as a linear weighting scheme, a binary weighted scheme, or a logarithmically weighted scheme.

With continued reference to FIG. 2B, following assignment of the model libraries, at 216, logic synthesis and in-place optimization on the rest of the system circuit representation is performed, at 218. This involves mapping the HDL into a gate level description, and allowing timing analysis and in-place optimization on the gates. The timing information for the parallel multi-state driver input signals are then extracted from timing reports generated by the logic synthesis module in the form of text files, or read directly within the program performing timing, at 220. For example, the minimum delay through the parallel driver is extracted when the parallel driver is programmed to produce the shortest delay. The maximum delay through the parallel driver is extracted when the parallel driver is programmed to produce the longest delay.

Further referring to FIG. 2B, following extraction of the timing information, at 220, the parallel multi-state driver netlist may be modified to meet the design constraints. This involves checking the range and resolution, at 224 and 226 and/or measuring the propagation delay, at 232 and 234. If the range is too large, then the number of cells is decreased, at 228, by the logic synthesis module. If the range is too small, then the number of cells is increased, at 230, by the logic synthesis module. Any optimization to the number of cells brings the design flow back to the assignment of a model library step, at 216. If no range modifications are made, then the measurements proceed to check the propagation delay. If the delay is too large, then the size of the cells is increased, at 236, by the logic synthesis module. If the delay is too small, then the size of the cells is decreased, at 238, by the logic synthesis module. Any optimization to the cell sizes brings the design flow back to the assignment of a model library step, at 216. If no cell size modifications are made, then the measurements proceed to perform timing analysis and optimization on the current netlist, at 240.

Figure 2C:
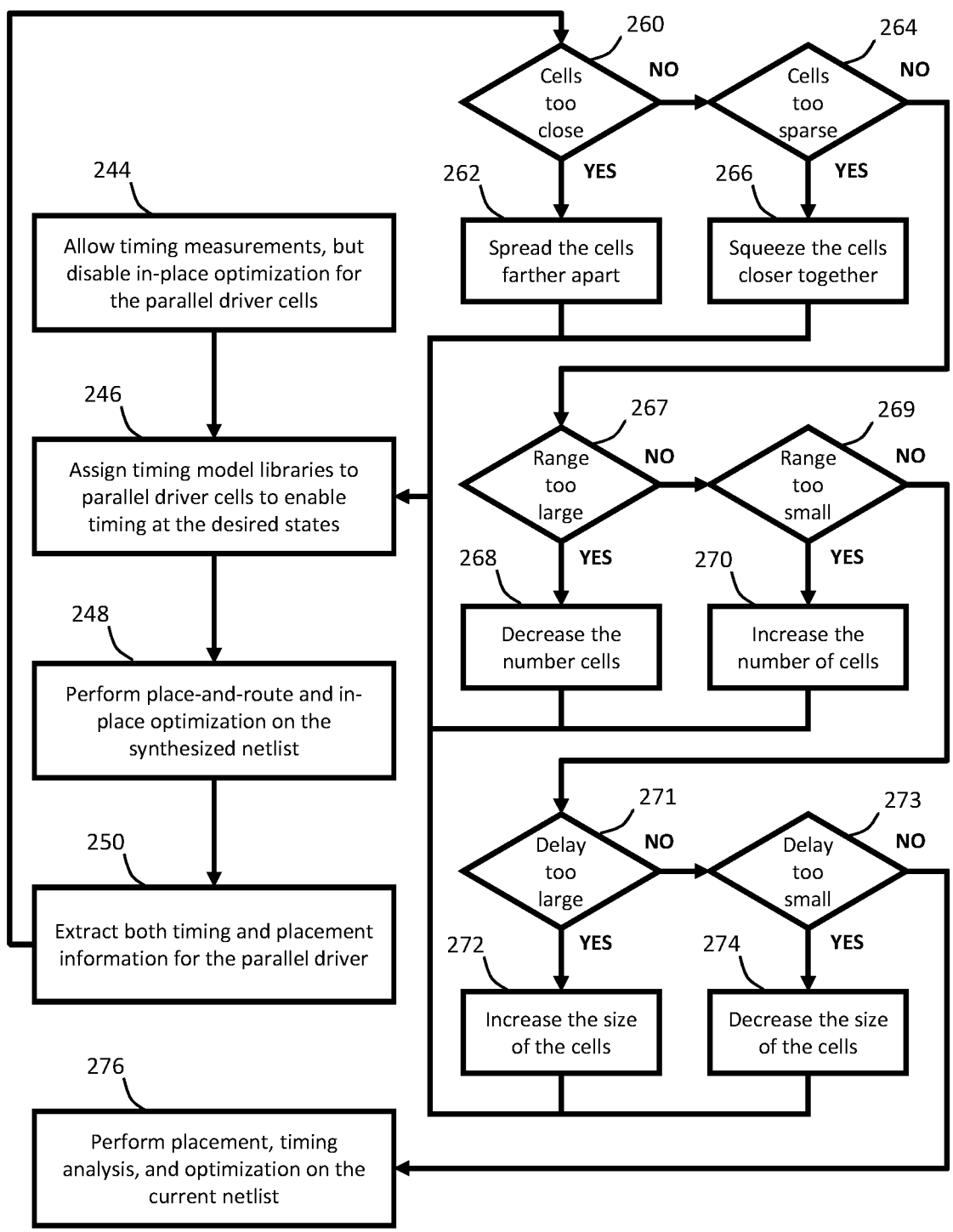
FIG. 2C illustrates steps corresponding to the place-and-route step of FIG. 2A.

Referring back to FIG. 2A, once the logic synthesis module completes its operations, at 210, and the timing constraints are satisfied, at 241, the design flow proceeds to perform place-and-route operations with in-place optimization combined with the programmable model libraries generated earlier (step 204), at 242. FIG. 2C illustrates a flowchart of steps for one embodiment of the place-and-route operations. During place-and-route, certain aspects of the parallel driver cells are disabled, at 244, such as in-place optimization on the parallel driver or the individual driver cells. In other words, the place-and-route module is configured to not change the connections for the parallel driver, nor the size of the constituent driver cells. The appropriate timing model library is then assigned to the parallel driver and the individual driver cells, at 246, to enable timing at the desired operational state, similar to the logic synthesis operations above.

With continued reference to FIG. 2C, following assignment of the model libraries, at 246, place-and-route and in-place optimization on the synthesized netlist is performed, at 248. The placement and timing information for the parallel multi-state driver input signals are then extracted from timing reports generated by the place-and-route module, at 250. The minimum delay through the parallel driver is extracted when the parallel driver is programmed to produce the shortest delay. The maximum delay through the parallel driver is extracted when the parallel driver is programmed to produce the longest delay. Placement information involves the coordinates for the physical location of the driver cells. The locations can be accessed directly.

Further referring to FIG. 2C, following extraction of the timing information, at 250, the parallel multi-state driver netlist may be modified to meet the design constraints. This involves checking the placement, range and resolution of the cells. If the distance between cells is too close, at 260, then the cells are to be spread farther apart, at 262. If the cells are too sparse, at 264, then the cells are to be placed closer together, at 266. Any optimization to the distance between cells brings the design flow back to the assignment of a model library step, at 246. If no distance modifications are made, then the measurements proceed to check the cell range. If the range is too large, at 267, then the number of cells is decreased, at 268, by the place-and-route module. If the range is too small, at 269, then the number of cells is increased, at 270, by the place-and-route module. Any optimization to the number of cells brings the design flow back to the assignment of a model library step, at 246. If no range modifications are made, then the measurements proceed to check the propagation delay. If the delay is too large, at 271, then the size of the cells is increased, at 272, by the place-and-route module. If the delay is too small, determined at 273, then the size of the cells is decreased, at 274, by the place-and-route module. Any optimization to the cell sizes brings the design flow back to the assignment of a model library step, at 246. If no cell size modifications are made, then the measurements proceed to perform timing analysis and optimization on the current netlist, at 276.

Figure 2D:
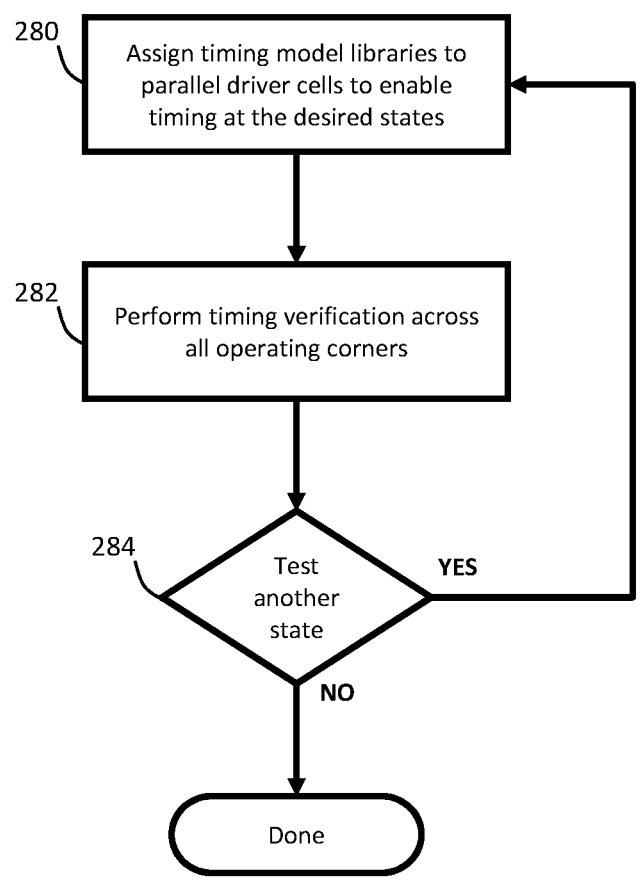
FIG. 2D illustrates steps corresponding to the verification step of FIG. 2A.

Referring back to FIG. 2A, once the place-and-route module completes its operations, at 242, and the timing constraints are satisfied, at 277, the design flow proceeds to perform verification operations with the programmable model libraries generated earlier (step 204), at 278. FIG. 2D illustrates a flowchart of steps for one embodiment of the verification operations. At 280, the appropriate timing model library is then assigned to the parallel driver and the individual driver cells to enable timing at the desired operational state, similar to the logic synthesis and place-and-route operations above. A timing verification is then performed on the entire digital system description across all relevant operating corners, at 282. Each desired state of the parallel multi-state driver may be iteratively tested, at 284, and appropriate repeating of steps 280 and 282. If the timing is satisfied, at 286 (FIG. 2A), then the design flow is complete, and the completed physical design implementation resulting from the design flow described above may be utilized to generate pattern or mask data that may form the basis for photolithographic mask.

Figure 3A:
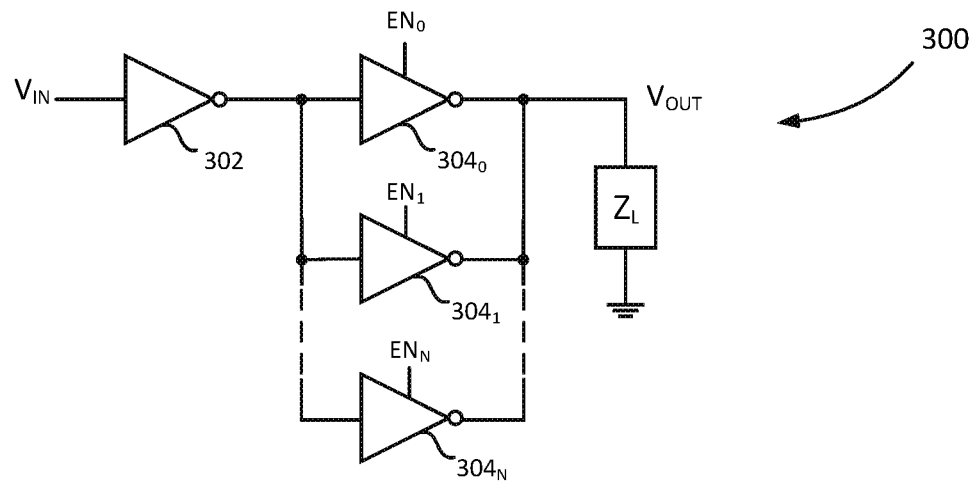
FIG. 3A illustrates one embodiment of an analog parallel multi-state driver circuit.

FIG. 3A illustrates a generic analog parallel tristate inverter circuit, generally designated 300. The circuit includes a buffer 302 that receives an input signal V. A plurality of inverters $304_0$-$304_N$ are disposed in parallel to receive the output of the buffer 302. The inverters include respective control inputs to receive corresponding control signals $EN_0$-$EN_N$ to enable or disable the inverter. The multiple inverters together generate an output $V_{OUT}$ across an output impedance $Z_L$.

Figure 3B:
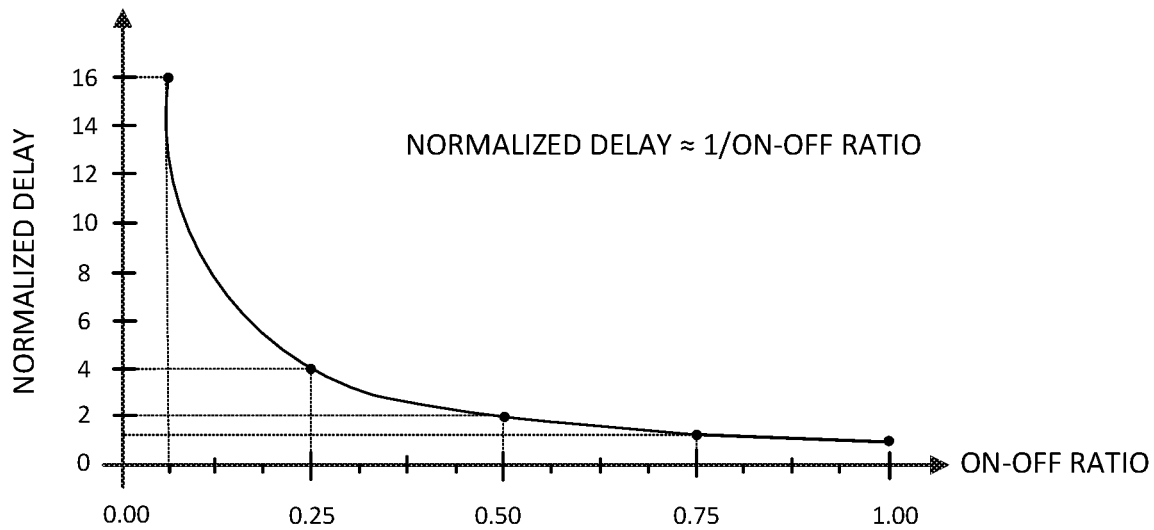
FIG. 3B is a graph plotting normalized propagation delay as a function of on-off ratio for the circuit representation of FIG. 3A.

FIG. 3B illustrates a graph of normalized delay associated with the tristate inverter circuit of FIG. 3A as a function of ON-OFF ratio. As seen from the graph, the normalized delay falls inversely with the increase in the ON-OFF ratio. When more inverters in FIG. 3, 304, are on, the delay decreases.

Figure 4A:
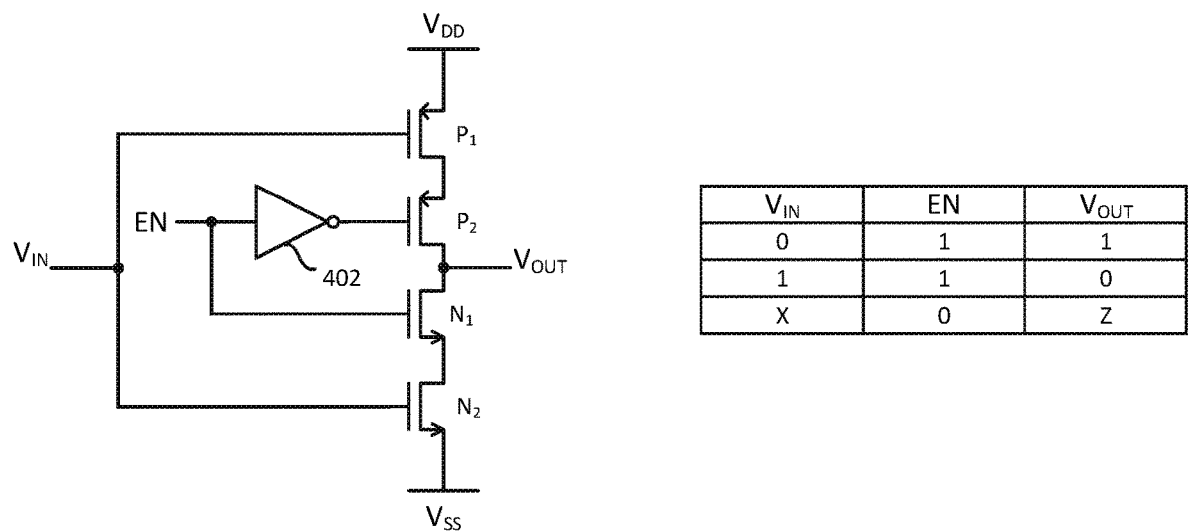
FIG. 4A illustrates one embodiment of a digital circuit representation of a tristate inverter.
Figure 4B:
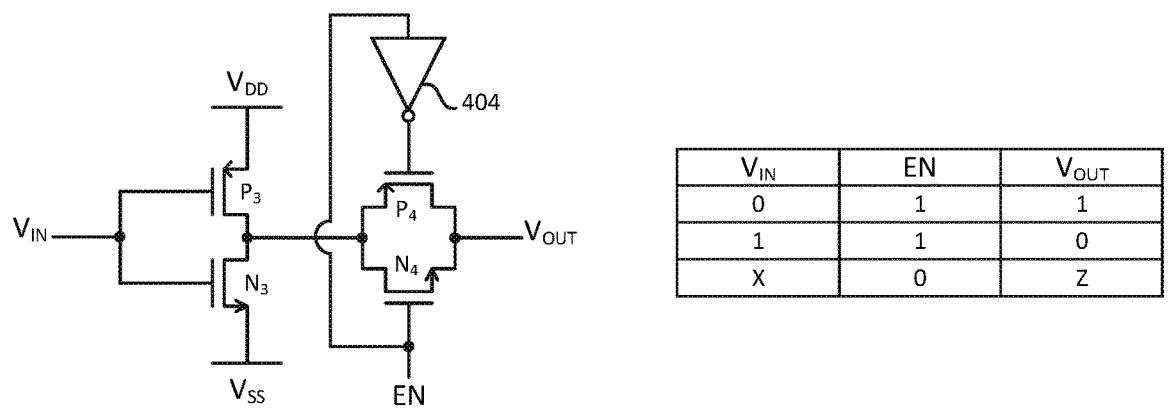
FIG. 4B illustrates a further embodiment of a digital circuit representation of a tristate inverter.

Each inverter of the circuit of FIG. 3 may be represented by the circuit representations of FIGS. 4A and 4B. Referring now to FIG. 4A, one representation of a tristate inverter circuit includes a pair of P-MOS transistors P1 and P2 disposed in series, with P1 having a first gate terminal tied to an input voltage $V_{IN}$, a source terminal tied to a supply voltage $V_{DD}$, and a drain terminal coupled to the source terminal for P2. An inverter 402 includes an input to receive a control signal EN, and an output coupled to the gate terminal of P2. A first N-MOS transistor N1 includes a gate terminal to receive the control signal EN, a drain terminal tied to the drain terminal of transistor P2, and a source terminal coupled to a drain terminal for transistor N2. A gate terminal for N2 receives the input voltage $V_{IN}$, while a source terminal for N2 is tied to $V_{SS}$. The node formed by the drain terminal of P2 and the drain terminal of N1 generates an output voltage $V_{OUT}$. The state diagram associated with FIG. 4A shows the various combinations of states with "1" representing a logic high, "0" representing a logic low, "X" representing a don't care state, and "Z" representing a high impedance state.

FIG. 4B illustrates an alternative tristate inverter circuit representation similar to FIG. 4A. A P-MOS transistor P3 includes a drain terminal coupled to a drain terminal of N-MOS transistor N3. The gate terminals of both P3 and N3 are tied to an input voltage $V_{IN}$. An output formed by a drain terminal of P3 and a drain terminal of N3 feeds a node formed by connected source terminals of transistors P4 and N4. A gate terminal for transistor N4 receives a control signal EN, which is also fed to an input of an inverter 404. The output of the inverter is fed to a gate terminal for transistor P4. The drain terminals for transistors P4 and N4 are tied together to form an output $V_{OUT}$. The state diagram associated with FIG. 4B shows the various combinations of states with "1" representing a logic high, "0" representing a logic low, "X" representing a don't care state, and "Z" representing a high impedance state.

Figure 5A:
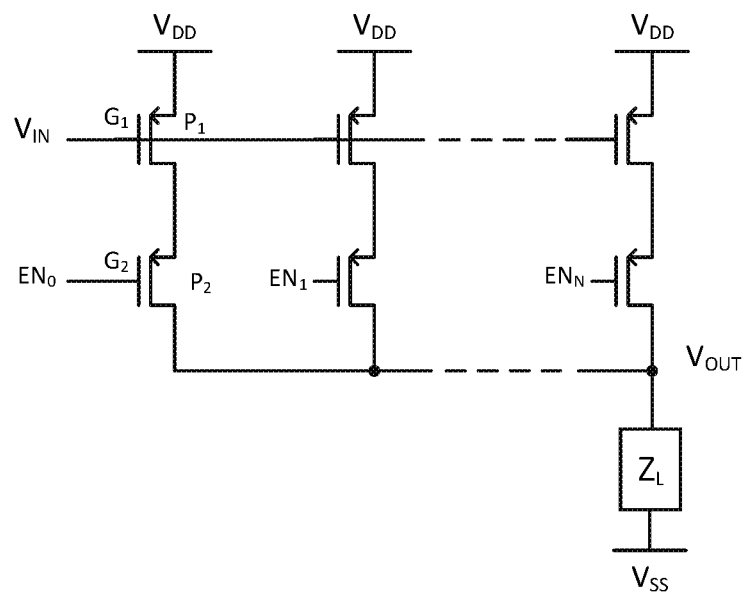
FIG. 5A illustrates one embodiment of a digital circuit representation of a parallel pull-up driver circuit.

FIG. 5A illustrates one embodiment of a circuit representation for a parallel pull-up device. The circuit representation includes a first pair of P-MOS transistors P1 and P2 that are coupled in series. The first transistor P1 receives an input voltage $V_{IN}$ at a gate terminal G1, and a source terminal coupled to the supply voltage $V_{DD}$. The second transistor P2 receives at its gate terminal G2 a control signal $EN_0$. A drain terminal for the second transistor is tied to an output node $V_{OUT}$. A difference between the output voltage $V_{OUT}$ and a return voltage $V_{SS}$ is applied across an output impedance $Z_L$. Additional pairs of P-MOS transistors are provided in parallel with the first pair and configured in a similar manner to provide the additional programmable state for the parallel circuit.

Figure 5B:
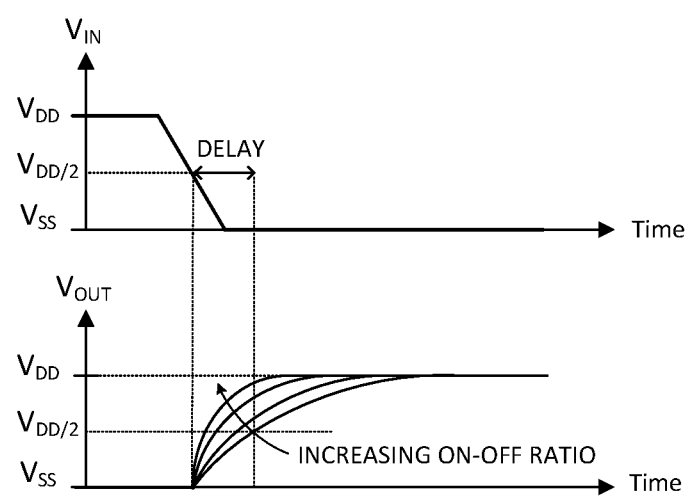
FIG. 5B is a graph depicting $V_{IN}$ and $V_{OUT}$ over time for the circuit of FIG. 5A.

FIG. 5B illustrates graphs depicting $V_{IN}$ and $V_{OUT}$ over time for the circuit of FIG. 5A. Generally, the delays shown in the graph represent what will be captured by the library file.

Figure 6A:
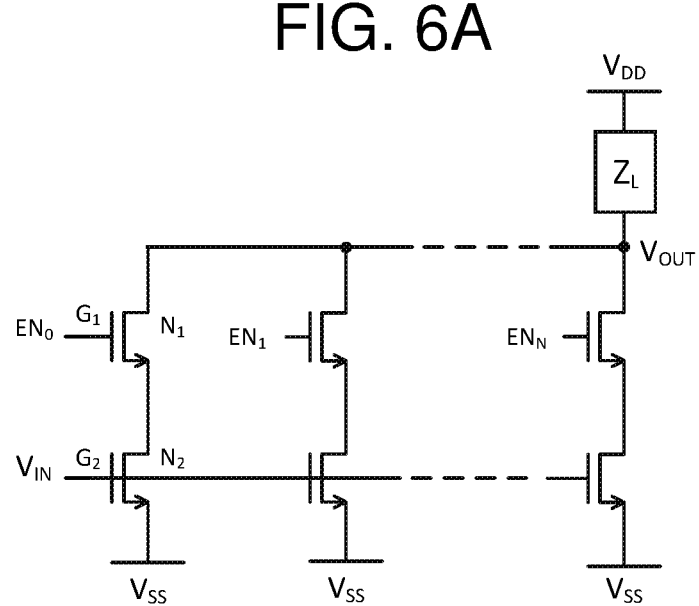
FIG. 6A illustrates one embodiment of a digital circuit representation of a parallel pull-down driver circuit.

FIG. 6A illustrates one embodiment of a circuit representation of a parallel pull-down driver circuit. The circuit is similar to the pull-up circuit representation of FIG. 5A, but with the use of N-MOS transistors. The circuit representation includes a first pair of N-MOS transistors N1 and N2 that are coupled in series. The first transistor N1 receives an input control signal $EN_0$ at a gate terminal G1, and generates an output voltage $V_{OUT}$ at a drain terminal. The second transistor N2 receives at its gate terminal G2 an input voltage V. A source terminal for the second transistor is tied to a return voltage VSS. A difference between the output voltage $V_{OUT}$ and a supply voltage $V_{DD}$ is applied across an output impedance $Z_L$. Additional pairs of N-MOS transistors are provided in parallel with the first pair and configured in a similar manner to provide the additional driver states.

Figure 6B:
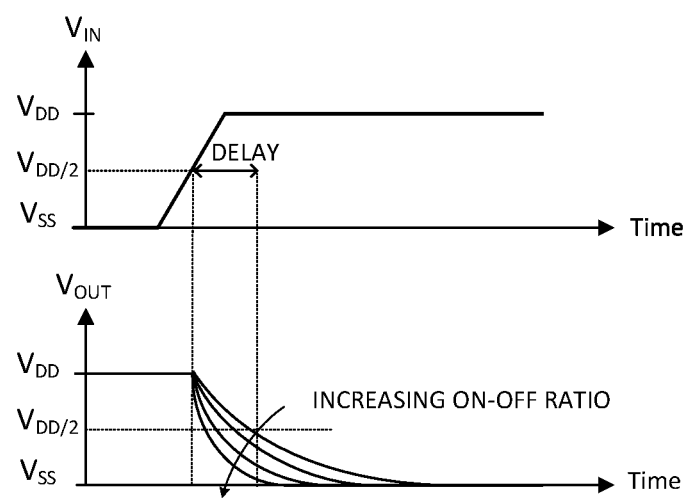
FIG. 6B is a graph depicting $V_{IN}$ and $V_{OUT}$ over time for the circuit of FIG. 6A.

Graphs depicting $V_{IN}$ and $V_{OUT}$ over time for the circuit of FIG. 6A are shown in FIG. 6B. Generally, the delays shown in the graph represent what will be captured by the library file.

Figure 7A:
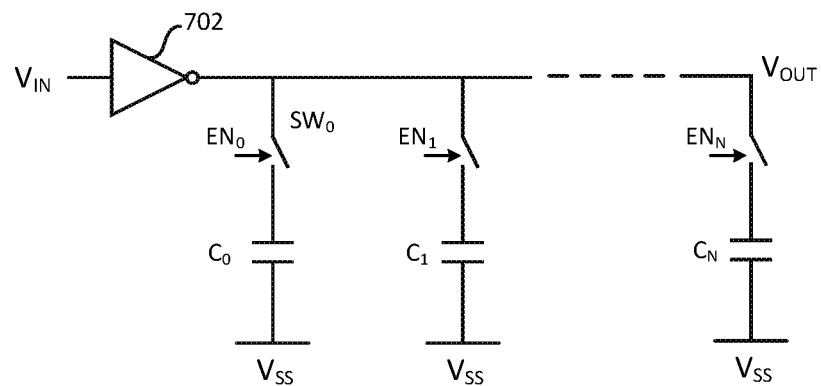
FIG. 7A illustrates one embodiment of a digital representation of a parallel switched capacitor circuit.

FIG. 7A illustrates one embodiment of a representation of a parallel switched capacitor circuit. The circuit includes a first inverter 702 that receives an input voltage $V_{IN}$ and generates an output voltage $V_{OUT}$. A first capacitor branch couples to the output voltage node and includes a first switch $SW_0$ (such as an N-MOS transistor) responsive to an input control signal $EN_0$ to enable or disable the switch. A first capacitor $C_0$ couples to the switch. Additional capacitor branches are provided in parallel with the first branch to provide the programmable state for the parallel circuit.

Figure 7B:
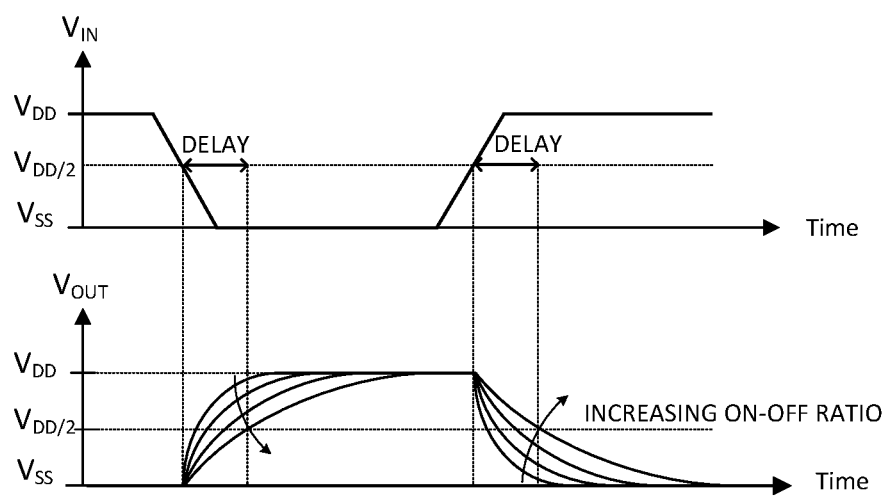
FIG. 7B is a graph depicting $V_{IN}$ and $V_{OUT}$ over time for the circuit of FIG. 7A.

FIG. 7B is a graph depicting $V_{IN}$ and $V_{OUT}$ over time for the circuit of FIG. 7A. Generally, the delays shown in the graph represent what will be captured by the library file.

Figure 8A:
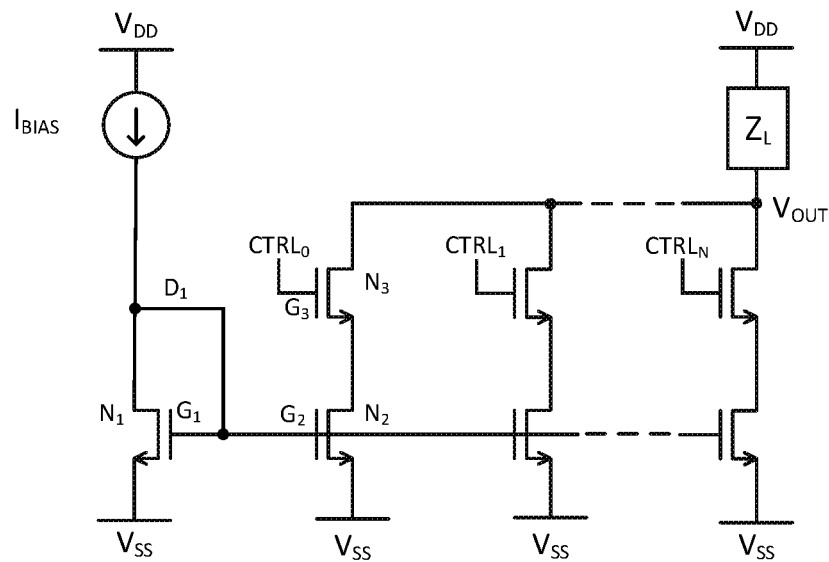
FIG. 8A illustrates one embodiment of a digital representation of a parallel current source circuit.

FIG. 8A illustrates one embodiment of a representation of a parallel current source circuit. The circuit includes current mirror that includes a first current source $I_{BIAS}$ that feeds a first N-MOS transistor N1. The first transistor has a gate terminal G1 fed back to a source terminal D1. A second N-MOS transistor N2 has a gate terminal G2 tied to the gate terminal G1 of transistor N1, and a drain terminal coupled to a third transistor N3 to complete the current mirror. A control signal $CTRL_0$ is fed to the gate terminal G3 of the third transistor. Additional current mirror branches are provided in parallel with the second and third transistors to provide the programmable state for the parallel circuit.

Figure 8B:
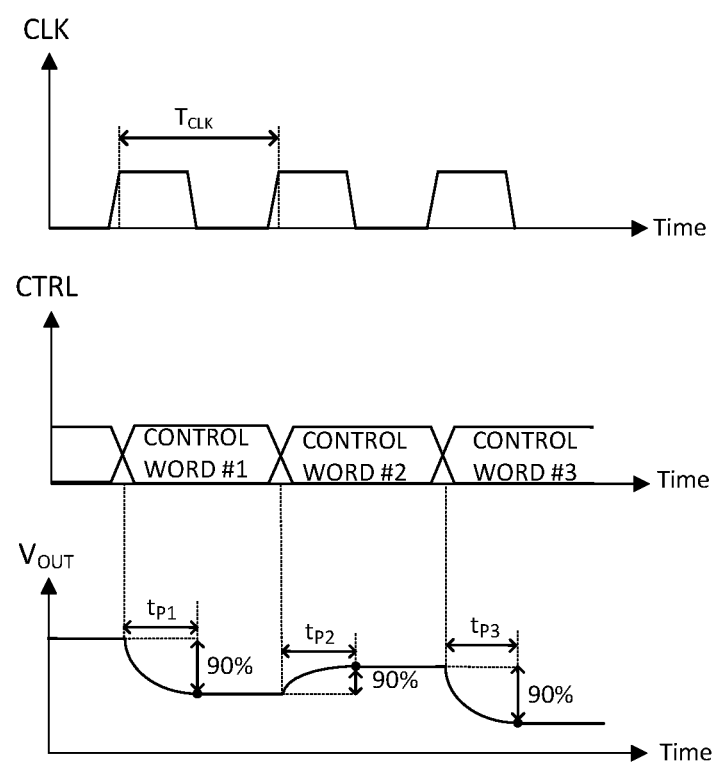
FIG. 8B is a graph depicting $V_{OUT}$, CTRL, and CLK over time for the circuit of FIG. 8A.

FIG. 8B is a graph depicting $V_{OUT}$, CTRL, and CLK over time for the circuit of FIG. 8A. Generally, the delays shown in the graph represent what will be captured by the library file.

Figure 9A:
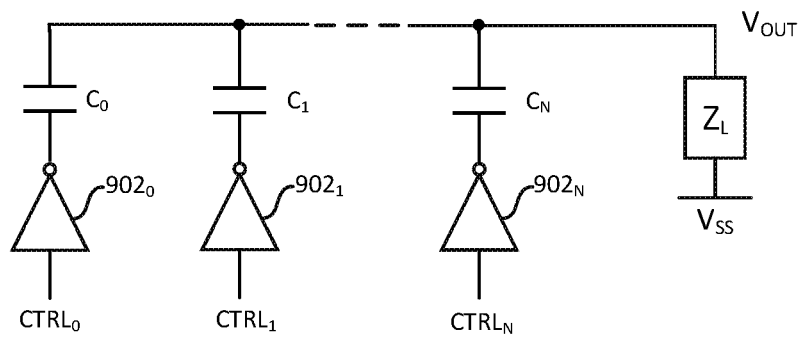
FIG. 9A illustrates one embodiment of a digital representation of a parallel capacitor coupled driver circuit.

FIG. 9A illustrates one embodiment of a representation of a parallel capacitor coupled driver circuit. The circuit employs a first driver branch having a first inverter $902_0$ receiving an input signal $CTRL_0$, and feeding an output to a first capacitor $C_0$. The output of the first capacitor $C_0$ is fed to an output node $V_{OUT}$. Additional driver branches are provided to achieve the programmable state for the parallel circuit.

Figure 9B:
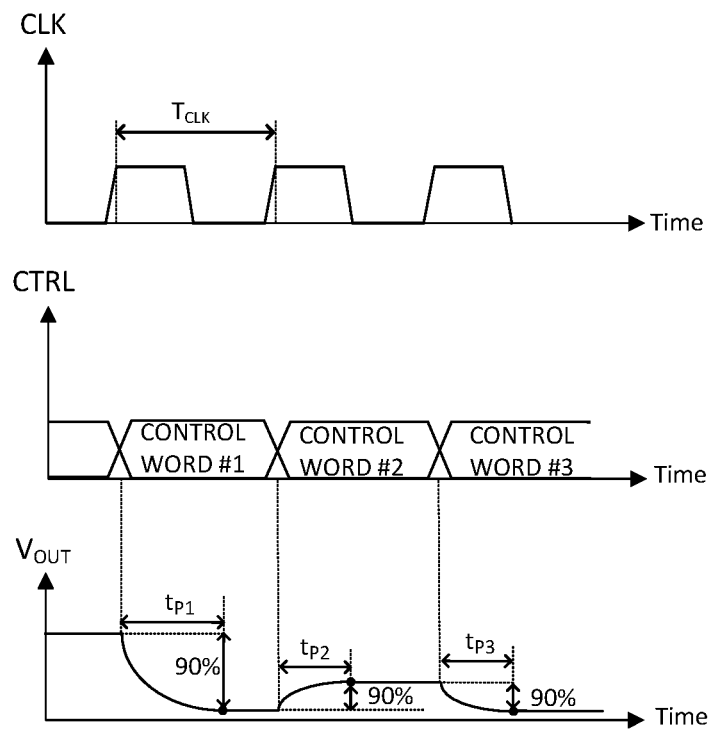
FIG. 9B is a graph depicting $V_{OUT}$, CTRL, and CLK over time for the circuit of FIG. 9A.

FIG. 9B is a graph depicting $V_{OUT}$, CTRL, and CLK over time for the circuit of FIG. 9A. Generally, the delays shown in the graph represent what will be captured by the library file.

Figure 10A:
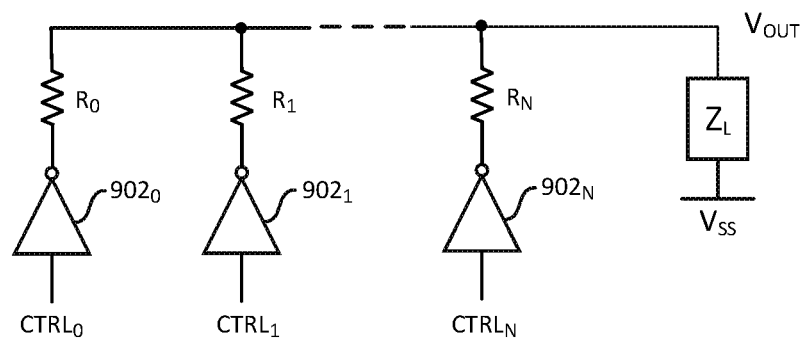
FIG. 10A illustrates one embodiment of a digital representation of a parallel resistor coupled driver circuit.

FIG. 10A illustrates one embodiment of a representation of a parallel resistor coupled driver circuit. The circuit is similar to the parallel capacitor driver circuit, but employing resistors $R_0$-$R_N$ instead of capacitors.

Figure 10B:
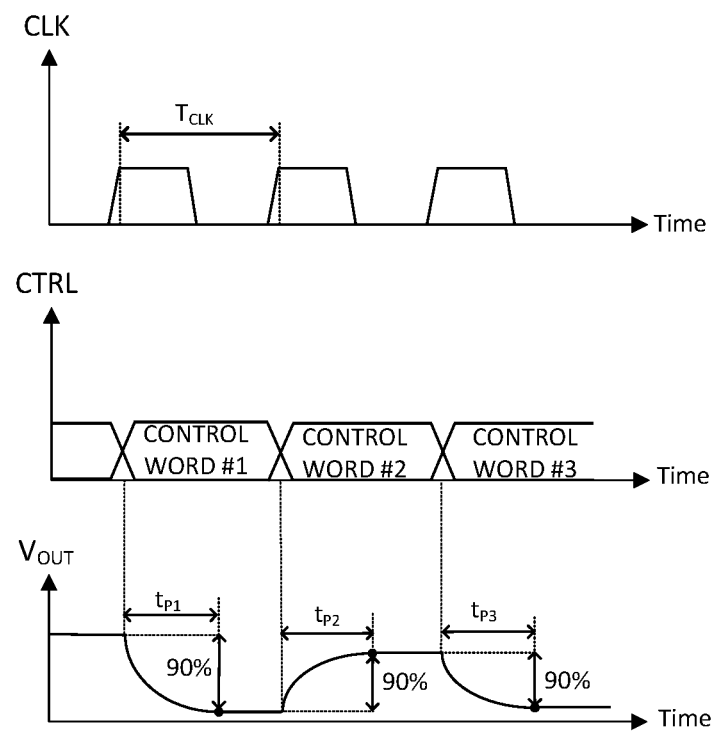
FIG. 10B is a graph depicting $V_{OUT}$, CTRL, and CLK over time for the circuit of FIG. 10A.

FIG. 10B is a graph depicting $V_{OUT}$, CTRL, and CLK over time for the circuit of FIG. 10A. Generally, the delays shown in the graph represent what will be captured by the library file.

Figure 11:
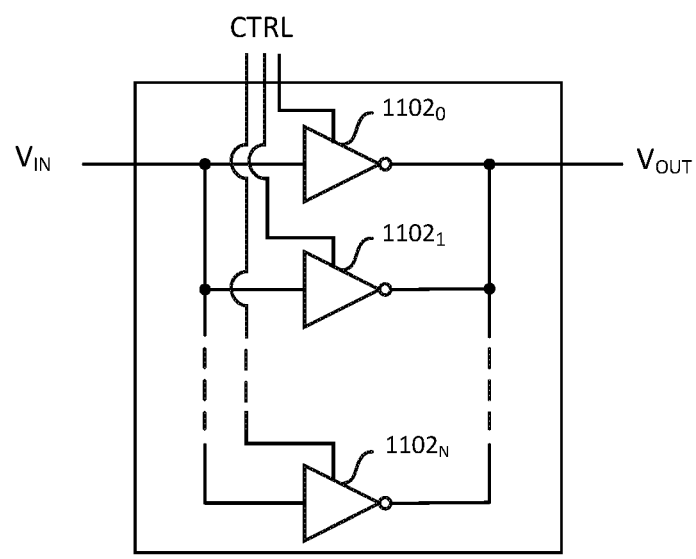
FIG. 11 illustrates one embodiment of a macro cell representation for the parallel multi-state driver circuit of FIG. 3.

FIG. 11 illustrates one embodiment of a macro cell representation for the parallel multi-state driver circuit of FIG. 3. The circuit includes multiple tristate drivers $1102_0$-$1102_N$ disposed in parallel such that an input for each driver receives an input voltage $V_{IN}$, and each output is tied to an output node $V_{OUT}$. Each driver also includes a control input to receive control signals to enable/disable each driver. The tristate drivers may be any size or type of multistate driver cell such as a pull-up or pull-down device, a current source, etc.

In one alternative embodiment, timing analysis for a digital design flow may be carried out similar to the method described with respect to FIGS. 2A-2D, but instead of utilizing a parametric timing analysis with programmable timing models, the method employs a Simulation Program with Integrated Circuit Emphasis (SPICE) analysis concurrent with the digital design flow. Generally, SPICE simulations are generated by a general-purpose, open source analog electronic circuit simulator to check the integrity of analog designs and to predict circuit behavior. With such a method, timing analysis is performed on the parallel driver using SPICE simulations as needed. FIGS. 12A-12D provide flow charts illustrating exemplary steps for such a method.

Referring now to FIG. 12A, the concurrent SPICE analysis method begins with an HDL description of the parallel multi-state driver being inserted into the digital system by connecting the desired parallel driver elements or cells, at 1208. The system constraints used by the digital timing analysis may then be defined, at 1210. The constraints may include, for example, input delays, output delays, clock frequency, and path delays for the analog parallel multi-state driver. Generally, the delay for the parallel driver should fall within some minimum and maximum range with a given resolution. Based on the clock frequency, the process can estimate how much delay is allowed for paths leading to and leading from the parallel driver. Specifically, the system constraints may constrain the path delay to the input of the parallel driver, and constrain the path delay from the output of the parallel driver. If the parallel driver satisfies the required minimum and maximum delays, and the digital system is constrained to allow for the delays, then the system will satisfy the timing requirements. The constraints may also come into play during synthesis and place-and-route operations, described below, such that the minimum delay through the parallel driver will be constrained when the parallel driver is programmed to produce the shortest delay, and the maximum delay through the parallel driver will be constrained when the parallel driver is programmed to produce the longest delay.

Figure 12B:
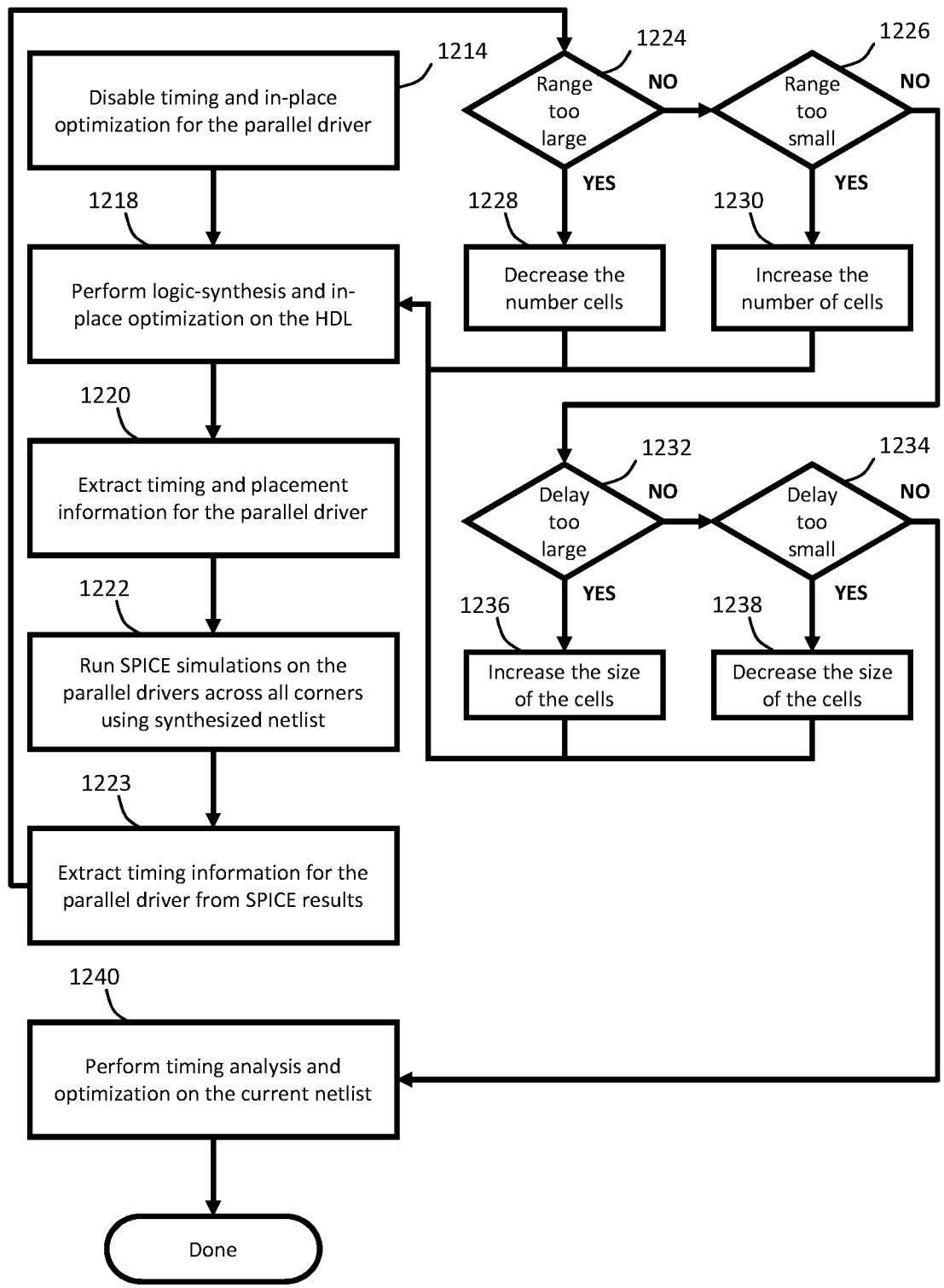
FIG. 12B illustrates steps corresponding to the logic synthesis step of FIG. 12A.

With the design constraints defined, at 1210, the design flow moves to logic synthesis, controlled by the logic synthesis module, at 1212. FIG. 12B illustrates a flowchart of steps setting forth one embodiment of a logic synthesis flow with in-place optimization combined with concurrently generated SPICE simulations. During logic synthesis, certain aspects of the parallel driver cells are disabled, at 1214, such as in-place optimization and timing measurements. In other words, the logic synthesis module is configured such that its timing analysis tools leave the parallel driver circuitry alone.

With continued reference to FIG. 12B, logic synthesis and in-place optimization on the rest of the system circuit representation is performed, at 1218. This involves mapping the HDL into a gate level description, and allowing timing analysis and in-place optimization on the gates. The timing information for the parallel multi-state driver input signals are then extracted from timing reports generated by the logic synthesis module in the form of text files, or read directly from within the program, at 1220, including input signal transition timing and output loading. SPICE simulations are then run across all relevant corners for the parallel driver using the synthesized netlist and the signal information generated by the logic-synthesis flow, at 1222.

Further referring to FIG. 12B, following the SPICE simulations, at 1222, the timing information (or voltage output, or current output, whatever is the defining feature) is extracted for the parallel drivers from the SPICE simulation, at 1223. The parallel multi-state driver netlist may then be modified to meet the design constraints using the SPICE results. This involves checking the range and resolution, at 1224 and 1226 and/or measuring the propagation delay, at 1232 and 1234. If the range is too large, then the number of cells is decreased, at 1228, by the logic synthesis module. If the range is too small, then the number of cells is increased, at 1230, by the logic synthesis module. Any optimization to the number of cells brings the design flow back to the performing logic synthesis and in-place optimization on the HDL, at 1218. If no range modifications are made, then the measurements proceed to check the propagation delay. If the delay is too large, then the size of the cells is increased, at 1236, by the logic synthesis module. If the delay is too small, then the size of the cells is decreased, at 1238, by the logic synthesis module. Any optimization to the cell sizes brings the design flow back to the performing logic synthesis and in-place optimization on the HDL, at 1218. If no cell size modifications are made, then the measurements proceed to perform timing analysis and optimization on the current netlist, at 1240.

Referring back to FIG. 12A, once the logic synthesis module completes its operations, at 1212, and the timing constraints are satisfied, at 1213, the design flow proceeds to perform place-and-route operations with in-place optimization combined with SPICE analysis and optimization, at

Figure 12C:
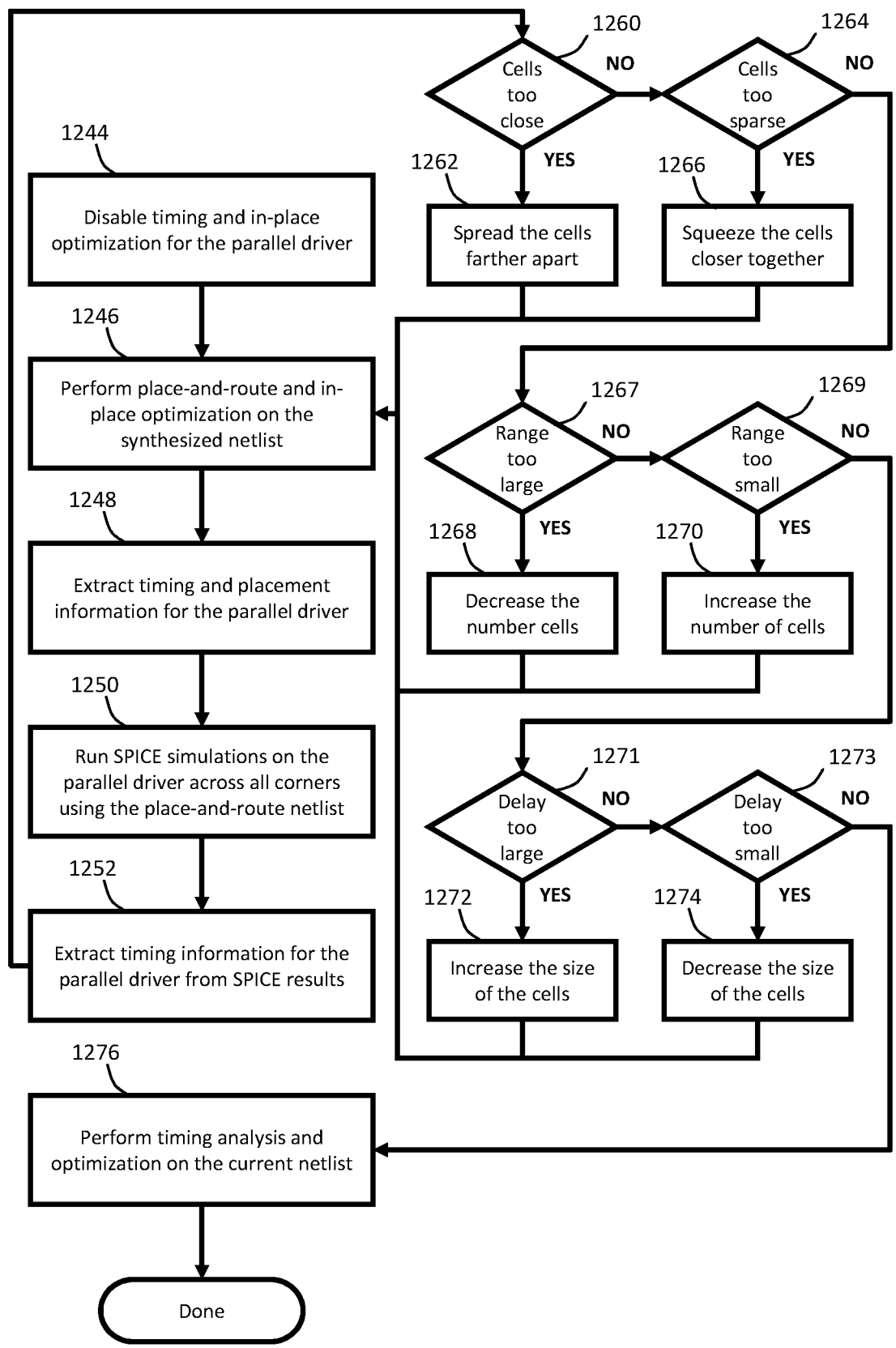
FIG. 12C illustrates steps corresponding to the place-and-route step of FIG. 12A.

1242. FIG. 12C illustrates a flowchart of steps for one embodiment of the place-and-route operations. During place-and-route, certain aspects of the parallel driver cells are disabled, at 1244, such as in-place optimization and timing measurements, similar to the logic synthesis module.

With continued reference to FIG. 12C, place-and-route and in-place optimization on the synthesized netlist may be performed, at 1246. The relevant characteristics for the parallel multi-state driver input signals assumed by the logic-synthesis flow may then be extracted, at 1248. This may include input signals, output load, parasitic wire loads, and/or placement of individual driver cells. SPICE simulations are then run across all relevant corners for the parallel drivers using the synthesized netlist, extracted parasitic impedances, and signal information generated by the place-and-route tool, at 1250. Following the SPICE simulations, the timing information (or voltage output, or current output, whatever is the defining feature) is extracted for the parallel drivers from the SPICE simulation, at 1252.

Further referring to FIG. 12C, following extraction of the timing information, at 1252, the parallel multi-state driver netlist may be modified to meet the design constraints. This involves checking the placement, range and resolution of the cells. If the distance between cells is too close, at 1260, then the cells are to be spread farther apart, at 1262. If the cells are too sparse, at 1264, then the cells are to be placed closer together, at 1266. Any optimization to the distance between cells brings the design flow back to the performing place-and-route and in-place optimization on the synthesized netlist, at 1246. If no distance modifications are made, then the measurements proceed to check the cell range. If the range is too large, at 1267, then the number of cells is decreased, at 1268, by the place-and-route module. If the range is too small, at 1269, then the number of cells is increased, at 1270, by the place-and-route module. Any optimization to the number of cells brings the design flow back to the performing place-and-route and in-place optimization on the synthesized netlist, at 1246. If no range modifications are made, then the measurements proceed to check the propagation delay. If the delay is too large, at 1271, then the size of the cells is increased, at 1272, by the place-and-route module. If the delay is too small, at 1273, then the size of the cells is decreased, at 1274, by the place-and-route module. Any optimization to the cell sizes brings the design flow back to performing place-and-route, at 1246. If no cell size modifications are made, then the measurements proceed to perform timing analysis and optimization on the current netlist, at 1276.

Figure 12D:
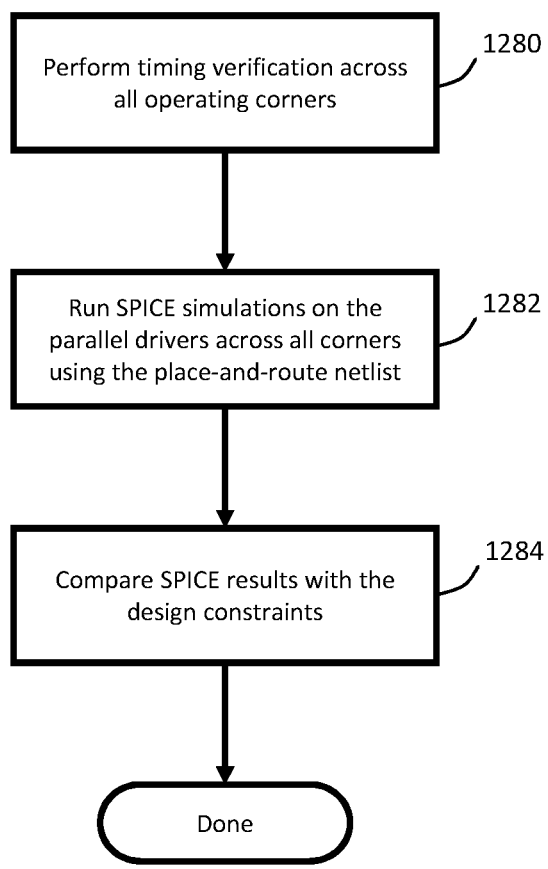
FIG. 12D illustrates steps corresponding to the verification step of FIG. 12A.

Referring back to FIG. 12A, once the place-and-route module completes its operations, at 1242, and the timing constraints are satisfied, the design flow proceeds to perform verification operations with the SPICE analysis, at 1278. FIG. 12D illustrates a flowchart of steps for one embodiment of the verification operations. At 1280, a timing verification is performed on the entire digital system description across all relevant operating corners. SPICE simulations are then run on the parallel driver across all corners using the place-and-route netlist at 1282. The SPICE results are then compared to the design constraints, at 1284. If the timing is satisfied at 1285, then the design flow is complete, and the completed physical design implementation resulting from the design flow described above may be utilized to generate pattern or mask data that may form the basis for photolithographic mask.

FIG. 13 illustrates an alternative timing analysis method that utilizes macro-cell circuit representations similar to the circuit of FIG. 11. Use of a pre-characterized macro-cell that represents a combination of the individual unit drivers enables timing analysis to be performed for parallel multi-state drivers using existing CAD tools.

Further referring to FIG. 13, the method begins by generating all permutations of the parallel multi-cell drivers, at 1302. This may involve varying the number of parallel drivers and/or varying the sizes of the parallel drivers. The desired timing behavior of all cell permutations is then pre-characterized for all load conditions, at 1304. This may involve characterizing the worst case timing at the slowest state, the best case timing at the fastest state, and/or measuring timing for all combinations of input signals. Liberty timing files are then generated, at 1306, needed by both the logic synthesis and the place-and-route modules. Once the timing files are generated, the HDL for the digital system may be written, at 1308. The system constraints used by the digital timing analysis may then be defined, at 1310. The constraints may include, for example, input delays, output delays, clock frequency, and path delays for the analog parallel multi-state driver macro-cell. Logic synthesis and in-place optimization may then be performed, at 1312. The timing may then be checked, at 1314. If the timing is not satisfied, then the HDL may be modified, at 1308. If the timing is satisfied, then place-and-route with in-place optimization may be performed, at 1316. The timing may then be checked, at 1318. If the timing is not satisfied, then the HDL may be modified, at 1308. If the timing is satisfied, then verification with in-place optimization may be performed, at 1320. The timing may then be checked, at 1322. If the timing is not satisfied, then the HDL may be modified, at 1308. If the timing is satisfied, then the design flow is complete, at 1324.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "l" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A computer-implemented method for manufacturing an integrated circuit chip comprising:
   generating an aggregate model for a first circuit description of an analog parallel multi-state driver circuit having multiple drivers, the first circuit description of the analog parallel multi-state driver circuit having programmable driver states for each of the multiple drivers based on independent driver control signals, the aggregate timing model dependent on the programmable driver states and including separate timing models for each of the multiple drivers, each driver timing model characterizing a respective driver at each of the programmable driver states;
   predicting timing behavior for the analog parallel multi-state driver circuit across multiple combinations programmable driver states utilizing the aggregate timing model and prior to constructing a second circuit description representing a digital system for employing the analog parallel multi-state driver circuit; and
   providing the first circuit description of the analog parallel multi-state driver circuit and the generated aggregate timing model for insertion into a second circuit description representing the digital system.

2. The computer-implemented method according to claim 1, further comprising:
   performing a static timing analysis of the second circuit description utilizing the first circuit description and the generated aggregate timing model.

3. The computer-implemented method according to claim 2, wherein
   the programmable driver states for the multiple driver comprise programmable enable/disable states, and wherein each of the multiple drivers is free to exhibit different enable/disable states based on a given driver control signal.

4. The computer-implemented method according to claim 3, wherein performing a static timing analysis of the second circuit description includes:
   measuring propagation delay through the representation of the analog multi-state driver circuit, the measured delay based on the respective programmed driver states of the multiple drivers.

5. The computer-implemented method according to claim 2, wherein
   each of the multiple drivers is free to exhibit a different cell size.

6. The computer-implemented method according to claim 5, wherein performing a static timing analysis of the second circuit description includes:
   measuring propagation delay through the representation of the analog multi-state driver circuit, the measured delay based on the sizes of the multiple drivers.

7. The computer-implemented method according to claim 1, wherein the aggregate timing model comprises:
   a parametric set of netlists and library files that exhibit a desired timing behavior for different combinations of the programmable driver states.

8. A non-transitory computer-readable storage medium, the medium storing instructions that when executed by a computer system will cause the computer system to:
   in response to a command from a client to commence operations for a digital design flow for a digital system, load aggregate timing model for a first circuit description of an analog parallel multi-state driver circuit having multiple drivers, the first circuit description of the analog parallel multi-state driver circuit having programmable driver states for each of the multiple drivers based on independent driver control signals, the aggregate timing model dependent on the programmable driver states and including separate driver timing models for each of the multiple drivers, each of the separate driver timing models characterizing a respective driver at each of the programmable driver states;
   utilize the aggregate timing model to predict timing behavior for the analog multi-state driver circuit across multiple combinations of programmable driver states and prior to constructing a second circuit description representing a digital system for employing the analog parallel multi-state driver circuit; and
   insert the first circuit description of the analog parallel multi-state driver circuit and the aggregate timing model into the second circuit description representing the digital system.

9. The non-transitory computer-readable storage medium of claim 8, further including instructions that when executed by the computer system will cause the computer system to:
   perform a static timing analysis of the second circuit description utilizing the first circuit description and the aggregate timing model.

10. The non-transitory computer-readable storage medium of claim 9, wherein:
    the programmable driver states for the multiple drivers comprise programmable enable/disable states, and wherein each of the multiple driver is free to exhibit different enable/disable states based on a given driver control signal.

11. The non-transitory computer-readable storage medium of claim 10, wherein the instructions to perform the static timing analysis of the second circuit description will cause the computer system to:
  measure propagation delay through the representation of the analog multi-state driver circuit, the measured delay based on the programmed driver states of the multiple drivers.

12. The non-transitory computer-readable storage medium of claim 9, wherein:
  each of the multiple drivers is free to exhibit a different cell size.

13. The non-transitory computer-readable storage medium of claim 12, wherein the instructions to perform the static timing analysis of the second circuit description will cause the computer system to:
  measure propagation delay through the representation of the analog multi-state driver circuit, the measured delay based on the respective sizes of the multiple drivers.

14. The non-transitory computer-readable storage medium of claim 8, wherein the aggregate timing model includes:
  a parametric set of netlists and library files that exhibit a desired timing behavior for different combinations of the programmable driver states.

15. A computer-implemented method for manufacturing an integrated circuit chip comprising:
  retrieving an aggregate timing model for a first circuit description of an analog parallel multi-state driver circuit having multiple drivers, the first circuit description of the analog parallel multi-state driver circuit having programmable enable/disable driver states for each of the multiple drivers based on driver control signals, the aggregate timing model dependent on the programmable driver states and including separate driver timing models for each of the multiple drivers, each of the separate driver timing models characterizing a respective driver at each of the programmable driver states;
  utilizing the aggregate timing model to predict timing behavior for the analog multi-state driver circuit across multiple combinations of programmable driver state and prior to constructing a second circuit description representing a digital system for employing the analog parallel multi-state driver circuit;
  inserting the first circuit description of the analog parallel multi-state driver circuit and the generated aggregated timing model into a second circuit description representing the digital system;
  logically-synthesizing the second circuit description; and
  performing a first static timing analysis on the second circuit description following the logically-synthesizing, the static timing analysis measuring propagation delay associated with the first circuit description of the analog parallel multi-state driver circuit based on the aggregated timing model.

16. The computer-implemented method for manufacturing an integrated circuit chip according to claim 15, further comprising:
  optimizing the second circuit description based on the first static timing analysis.

17. The computer-implemented method for manufacturing an integrated circuit chip according to claim 16, further comprising:
  place-and-routing the second circuit description; and
  performing a second static timing analysis on the second circuit description following the place-and-routing.

18. The computer-implemented method for manufacturing an integrated circuit chip according to claim 17, further comprising:
  optimizing the second circuit description based on the second static timing analysis.

19. The computer-implemented method for manufacturing an integrated circuit chip according to claim 16, further comprising:
  verifying the second circuit description; and
  performing a third static timing analysis on the second circuit description following the verifying.

20. The computer-implemented method for manufacturing an integrated circuit chip according to claim 19, further comprising:
  optimizing the second circuit description based on the third static timing analysis.

* * * * *